US010915548B2

(12) United States Patent
Pang et al.

(10) Patent No.: US 10,915,548 B2
(45) Date of Patent: Feb. 9, 2021

(54) METHOD OF ONLINE TRACING PESTICIDE RESIDUES AND VISUALIZING WARNING ON BASIS OF HIGH RESOLUTION MASS SPECTRUM, INTERNET AND GEOGRAPHIC INFORMATION

(71) Applicants: CHINESE ACADEMY OF INSPECTION AND QUARANTINE, Beijing (CN); WUHAN UNIVERSITY, Hubei (CN); BEIJING UNI-STAR INSPECTION TECHNOLOGY CO., LTD., Beijing (CN)

(72) Inventors: Guofang Pang, Beijing (CN); Xiaoping Pang, Hubei (CN); Xiaobo Zou, Beijing (CN); Chunlin Fan, Beijing (CN); Fu Ren, Hubei (CN); Qiaoying Chang, Beijing (CN); Haiyan Liu, Hubei (CN); Bing Fang, Beijing (CN); Ruobin Bai, Beijing (CN)

(73) Assignees: CHINESE ACADEMY OF INSPECTION AND QUARANTINE; WUHAN UNIVERSITY; BEIJING UNI-STAR INSPECTION TECHNOLOGY CO., LTD.

( * ) Notice: Subject to any disclaimer, the term of this patent is extended or adjusted under 35 U.S.C. 154(b) by 0 days.

(21) Appl. No.: 16/311,106

(22) PCT Filed: Apr. 13, 2018

(86) PCT No.: PCT/CN2018/082960
§ 371 (c)(1),
(2) Date: Dec. 18, 2018

(87) PCT Pub. No.: WO2018/192421
PCT Pub. Date: Oct. 25, 2018

(65) Prior Publication Data
US 2020/0311099 A1 Oct. 1, 2020

(30) Foreign Application Priority Data

Apr. 18, 2017 (CN) .......................... 2017 1 0250785

(51) Int. Cl.
*G06F 16/26* (2019.01)
*G06F 16/29* (2019.01)
(Continued)

(52) U.S. Cl.
CPC .............. *G06F 16/26* (2019.01); *G06F 16/29* (2019.01); *G06Q 10/06395* (2013.01); *G06Q 30/0185* (2013.01); *G06Q 50/02* (2013.01)

(58) Field of Classification Search
CPC ......... G06F 16/26; G06F 16/29; G06Q 50/02; G06Q 10/06395; G06Q 30/0185
See application file for complete search history.

(56) References Cited

U.S. PATENT DOCUMENTS

| | | | | |
|---|---|---|---|---|
| 2017/0112043 | A1* | 4/2017 | Nair | ..................... A01B 17/002 |
| 2019/0385114 | A1* | 12/2019 | Willey | ................ G06F 16/9558 |

FOREIGN PATENT DOCUMENTS

| | | | | |
|---|---|---|---|---|
| CN | 1414371 | A | * | 4/2003 |
| CN | 1605864 | A | * | 4/2005 |

(Continued)

OTHER PUBLICATIONS

International Search Report and Written Opinion issued in application No. PCT/CN2018/082960, dated Jul. 18, 2018 (10 pgs).
(Continued)

*Primary Examiner* — Mark D Featherstone
*Assistant Examiner* — Kweku William Halm
(74) *Attorney, Agent, or Firm* — Hayes Soloway P.C.

(57) ABSTRACT

A method of online tracing pesticide residues and visualizing an warning on the basis of high resolution mass spectrum, the Internet and geographic information. Among the
(Continued)

problems in data analysis on pesticide residue detection for edible agricultural products, problems such as multiple data dimensions, complex data relationships, and requirements for high accuracy of analysis are difficult to solve at present. Thus, a cross-field technology combining three different elements, high resolution mass spectrum, the Internet and geographic information, is adopted and a data collection and intelligent analysis system for pesticide residue detection for edible agricultural products is developed; four major basic sub-databases are established; and pesticide residue detection data is presented in a thematic map, such that safety conditions of pesticide residues of edible agricultural products in five levels of administrative regions including national, provincial, prefectural and municipal level and district and county level can be intuitively and simply displayed.

10 Claims, 5 Drawing Sheets

(51) Int. Cl.
*G06Q 10/06* (2012.01)
*G06Q 30/00* (2012.01)
*G06Q 50/02* (2012.01)

(56) References Cited

FOREIGN PATENT DOCUMENTS

| CN | 102629271 | | 8/2012 | |
| CN | 102455295 B | * | 7/2013 | |
| CN | 103257126 A | * | 8/2013 | ........... G01N 21/718 |
| CN | 103454435 B | * | 6/2014 | |
| CN | 104280471 A | * | 1/2015 | |
| CN | 105512218 | | 4/2016 | |
| CN | 205175996 U | * | 4/2016 | |
| CN | 105628839 | | 6/2016 | |
| CN | 105738460 | | 7/2016 | |
| CN | 106354760 | | 1/2017 | |
| CN | 107180076 | | 9/2017 | |

OTHER PUBLICATIONS

Pang et al., High-resolution mass spectrometry + Internet + geographic information (GIS) to build a large database of commonly used pesticide residues in the world to improve the quality and safety of agricultural products, China Science and Technology Achievements, 2016, pp. 51-53, machine-translated abstract only (5 pgs).

* cited by examiner

METHOD OF ONLINE TRACING PESTICIDE RESIDUES AND VISUALIZING WARNING ON BASIS OF HIGH RESOLUTION MASS SPECTRUM, INTERNET AND GEOGRAPHIC INFORMATION

I. TECHNICAL FIELD

The present invention relates to an online pesticide residue tracing and pre-warning method for edible agricultural products, particularly to an online pesticide residue tracing and pre-warning visualization method based on a ternary interdisciplinary integration technique of high-resolution mass spectrometry, Internet and geographic information system (GIS) for foods.

II. BACKGROUND ART

With the rapid development of social economy and the increase of the living standard of people, food safety has been paid more attention to. The situation of pesticide residues in commercial agricultural products is related to the health and safety of each consumer. Therefore, the government supervision departments should publish detection results timely and effectively, in addition to improving the detection efficiency and level of pesticide residues in agricultural products continuously.

In the pesticide residue detection reports published by relevant departments in China, the detection data is mainly presented as data tables and some statistical charts. On one hand, the forms cannot reflect the distribution of pesticide residues in space-time ranges well; on the other hand, it is difficult for the public to understand, and cannot serve well as a reference for the government to make decision; it cannot serve as a guidance for the enterprises self-discipline; it cannot serve as a reference for the public safe consumption; and it cannot enlighten scientific and technological researchers to dig deep on food safety research.

In addition, as highly digitization, informatization and automation of non-targeted pesticide residue detection techniques have been realized, massive analytical data are generated. It is a challenge to conventional data statistics and analysis methods. Therefore, it is urgent to develop an innovative big data acquisition, transformation, statistics, and intelligent analysis system.

In the main data visualization approaches, thematic maps have more advantage than tables and statistical charts, etc. The maps can intuitively express complex and multi-dimensional data with spatial attributes. By generating thematic maps from processed detection data, the situation of food safety on different regions markets can be reflected more clearly and intuitively.

Up to now, there are few reports on pesticide residue thematic maps and their mapping methods and standards. Especially, there is no report on online pesticide residue visualization methods based on the integration of high-resolution mass spectrometry, Internet and geographic information system (GIS). This invention focuses on the visualization and map language standardization of pesticide residue detection data, aims to provide references for the government policy-making and provides public services.

III. CONTENTS OF THE INVENTION

In the present invention: (1) a ternary interdisciplinary integration technique of high-resolution mass spectrometry, Internet and geographic information system (GIS) is developed independently, and a pesticide residue detection data acquisition and intelligent analysis system for foods is constructed against the challenges in pesticide residue detection data analysis for edible agricultural products, including multiple data dimensions, complex data relationship and high requirement for accuracy of analysis, etc.; (2) a nation-wide pesticide residue detection result database and four major basic sub-databases (e.g., multinational MRLs database, etc.) are established based on in-depth analysis of the characteristics of pesticide residue detection data and requirement analysis; (3) a multi-dimensional cross analysis method oriented to pesticide residue detection data, a comprehensive assessment and pre-warning model of pesticide residue contamination are put forward; (4) a nation-wide pesticide residue detection platform based on Internet is constructed to present pesticide residue detection data on thematic maps (atlas or network electronic maps). These thematic maps can intuitively and simply exhibit the situation of pesticide residues in edible agricultural products in four-level administrative divisions (nation-wide—provincial level—prefectural level—district or county level). The technical scheme of the present invention is as follows:

an online pesticide residue tracing and pre-warning visualization method based on a ternary interdisciplinary integration technique of high-resolution mass spectrometry, Internet and geographic information system (GIS) is developed to realize visual display, pre-warning and tracing of pesticide residue information on maps. The method comprises three parts: establishing a rapid pesticide residue detection method based on high-resolution mass spectrometry for edible agricultural products; establishing a nation-wide pesticide residue detection information sharing platform based on Internet; performing visual analysis and presentation based on geographic information of nation-wide administrative divisions.

The first part is to establish a rapid pesticide residue detection method based on high-resolution mass spectrometry. First, a first MS accurate mass database of more than 1,000 pesticides commonly used in the world and a second MS fragment ion spectra library are established by Liquid Chromatography Quadrupole Time-of-Flight Mass Spectrometry (LC-Q-TOF/MS) and Gas Chromatography Quadrupole Time-of-Flight Mass Spectrometry (GC-Q-TOF/MS). Then, one sample preparation, and more than 1,200 pesticides are detected rapidly in non-targeted manner by two high-resolution mass spectrometry detection techniques (GC-Q-TOF/MS and LC-Q-TOF/MS) simultaneously.

The second part is to construct a nation-wide pesticide residue detection information sharing platform based on Internet, including multi-dimensional data large databases and data processing.

The multi-dimensional data large databases comprise a nation-wide pesticide residue detection result database and four major basic sub-databases.

The four major basic sub-databases are a multi-national MRLs database, an agricultural product category database, a basic pesticide information database and a geographic information database, wherein, the multi-national MRLs database mainly comprises China MRL, Hong Kong of China MRL, US MRL, EU MRL, Japan MRL and CAC MRL, with 241,527 items of related MRL standards, including targeted pesticides, agricultural products, maximum residue limits, criteria establishment nation/region/organization; the agricultural product category database mainly contains China, Hong Kong of China, US, EU, Japan and CAC classification standards, and specifically comprises names of agricultural products, primary, secondary and tertiary classification information, etc.; the basic pesticide information database contains basic information, toxicity information, function information, chemical composition, prohibition information and derivative information, and specifically comprises names of targeted pesticides, CAS registry numbers, toxicity levels, whether the pesticides are metabolic products or not and their metabolic precursors, and whether the pesticides are prohibited in the standards or not; the geographic information database covers required geographical scopes, and comprises detailed address of all sampling spots in provincial administrative division, prefectural administrative division and county administrative division, etc.

The nation-wide pesticide residue detection result database is obtained by the following method: Firstly, detecting the pesticide residues in 150 species of edibles agricultural products in 18 categories all year according to season with the rapid pesticide residue detection method based on high-resolution mass spectrometry, via several union laboratories distributed across the country and under five unified standard operations (unified sampling, unified sample preparation, unified detection method, unified format data uploading, and unified format statistical analysis reports), raw data of relevant pesticide residues are obtained.

Secondly, correlating each piece of raw pesticide residue data with the information in the four major basic sub-databases: (1) replacing the names of all pesticide metabolites with the names of original pesticides according to the information of an agricultural product category database; (2) replacing non-standard names of agricultural products with standard names and unifying the agricultural product classification method according to the agricultural product category database; (3) judging the detection result of each detected item against different MRL standards according to the information in a multi-national MRLs database; (4) categorizing the pesticides by their properties according to the information of a basic pesticide information database; (5) locating each sampling site according to the information of a geographic information database, to ascertain the detailed geographic location and involved administrative division of each sampling site.

Finally, the detection data of pesticide residues in the agricultural products comprises three parts of information: sample identification information, geographic information of sample collection and sample detection information, to realize dynamic addition and real-time update of the nation-wide pesticide residue detection result database. The sample identification information records information such as sample name, sample number and sampling time, etc.; the geographic information of sample collection records information such as sampling site, type of sampling site (supermarket, farmers' market or farm) and province/city/county of the sampling site, etc.; the sample detection information records information such as name of detected item, CAS registry number of detected item, detection result, detection method, qualitative TOF score, and qualitative Q-TOF score, etc. The sample name refers to the name of the agricultural product, including more than 150 species of fruits and vegetables, such as tomato, cucumber and apple, etc.; the detected item refers to the detected pesticide, including more than 1,000 pesticides, such as carbendazim, dimethomorph, acetamiprid, and metalaxyl, etc.

The data processing is to establish a data integration and processing model (data acquisition—information supplementation—derivative merging—prohibited pesticide alert—contamination level judgment), realize rapid online acquisition and integration of multi-pesticide residue detection result data, and make accurate judgments according to the MRLs for pesticide residues of several countries.

The third part is to carry out visual analysis and presentation based on geographic information of each administrative division in the country, including thematic map generation through statistics and conversion as well as map visualization of the information in the nation-wide pesticide residue detection result database.

The geographic information of each administrative division in the country mainly comprises residential areas, major water systems and boundaries. Four-level administrative maps of pesticide residues status are included in this invention, i.e. the national administrative map, province-level administrative maps, city-level administrative maps, and county-level administrative maps. The boundaries of the administrative divisions are obtained through format conversion of an "Administrative Map of China (Vector Edition)" downloaded from the website of State Bureau of Surveying and Mapping. The information of residential areas and water systems is obtained through digitization of a "Standard Base Map of China (1:4,000,000).JPG" downloaded from the website of State Bureau of Surveying and Mapping.

In the statistics and conversion of the information in the nation-wide pesticide residue detection result database, the statistics processing comprises the calculation of maximum value, minimum value, average value and median value, etc.; for example, the information of the greatest species of pesticides detected in each region, the vegetables with the average highest frequency of detected pesticides and the species of pesticides with the highest exceeding rate comparing with the China MRLs; the conversion comprises statistical data selection, type selection, form change and color coding of statistical chart, and classification method selection, classification number and color systems of the classification chart, etc. The specific statistical indexes and conversion methods mainly include three aspects, i.e., general situation of pesticide detection, analysis of detected pesticides, and comparison with MRL standards. The specific content and expression methods are shown in Table 1.

TABLE 1

| Statistics and Conversion of Information in Nation-Wide Pesticide Residue Detection Result Database | |
|---|---|
| Chart name | Content and expression method |
| Statistics and expression method of general situation of pesticide detection | |
| General situation of sampling and situation of pesticide detection | Distribution of sampling sites (expressed by positioning points); Percentages of "exceeding", "detected but not exceeding", "not detected" in each region (regional statistical charts); Quantity of samples (pie diameter); Number of sample species (base colors of classifications) |

TABLE 1-continued

Statistics and Conversion of Information in Nation-Wide Pesticide Residue Detection Result Database

| Chart name | Content and expression method |
|---|---|
| Detection rate and percent of pass of pesticides at each sampling site | Number of samples in which pesticides are not detected, detected but do not exceed standard, and exceed standard and total number of samples at each sampling site |
| Proportions of pesticide residues in vegetables and fruits | Proportions of fruits and vegetables in which pesticides exceed standard, are detected but do not exceed standard, and are not detected |
| Agricultural products in which the number of detected pesticide species is the highest | Numbers of detected pesticide species in individual agricultural products |
| Agricultural products in which the detected frequency of pesticides is the highest | Detected frequencies of pesticides in individual agricultural products |
| Species numbers and proportions of detected pesticide | Species number and proportions of detected pesticide in individual samples |
| Agricultural products with the highest (lowest) percent of pass | fruits and vegetables with top 10 and bottom 10 highest percent of pass according to China MRL standard |
| Statistical analysis of detected pesticides | |
| Pesticides with the highest detected frequency | N pesticides with the highest detected frequency |
| Categories of detected pesticides | Categories of detected pesticides and proportions (regional statistical charts); Number of species (radius) |
| Detected pesticide residue levels | Detected pesticide residue levels and proportions (<1, 1-5, 5-10, 10-100, 100-1,000, and >1,000 µg/kg); Average values of pesticide residues (base colors of the classifications) |
| Toxicities of detected pesticides | Toxicity classification of detected pesticides and proportions (statistics by pesticide species), and whether the pesticides are prohibited or not; Optional indicator: proportions of detected frequencies of highly toxic and vitally toxic pesticides (base colors of the classifications) |
| Distribution of agricultural products containing vitally toxic or highly toxic pesticides | Location distribution map of agricultural products containing vitally toxic or highly toxic pesticides; Optional indicator: detection rates of samples containing highly toxic or vitally toxic pesticides (base colors of classifications) |
| XX detected pesticides and frequencies | Fruits and vegetables with the most serious contamination are selected for the detected pesticide species and frequencies of special samples |
| XX exceeding-standard pesticides and frequencies | exceeding-standard pesticide species and frequencies of special samples (China, Japan and European Union) |
| Distribution of detected vitally toxic and highly toxic pesticides in agricultural products | Distribution of vitally toxic and highly toxic pesticides in agricultural products |
| Agricultural products in which the number of detected vitally toxic or highly toxic pesticides is the greatest | Detected frequency and exceeding-standard frequency of highly toxic or vitally toxic pesticides in top N species of vegetables and top N species of fruits in which highly toxic or vitally toxic pesticides are detected |
| Pesticides with the highest exceeding rate | Top N pesticides with the highest exceeding rate (China, Japan and European Union) |
| Comparative statistical analysis with different MRL standards | |
| Proportions of detected pesticides against each MRL standard | Quantities and proportions of detected pesticides against each MRL standard |
| Exceeding-standard situation of pesticides according to different MRL standards | Proportions of samples in which pesticides exceed standard, are detected but do not exceed standard, and not detected according to different MRL standards |
| Pesticides with the highest exceeding-standard frequency according to different MRL standards | Specifies of agricultural products with the highest exceeding-standard frequency (top 15, 10, 8 and 5) (China, Japan and European Union) |
| Pesticides with the second highest exceeding-criteria frequency according to different MRL standards | Pesticides with the second highest exceeding-standard frequency (top 15, 10, 8 and 5) (China, Japan and European Union) |
| Distribution of exceeding-criteria agricultural products according to different MRL standards | Distribution of exceeding-standard agricultural products in different sampling regions according to different MRL standards (presented by vegetables and fruits) |

The map visualization comprises: map graphic language standardization, map color language standardization, chart interaction and map interaction.

The map graphic language standardization design comprises:

1) Geographical base maps of different regions: Different thematic maps of the same city should adopt the same geographical base map to facilitate the readers to compare with different thematic features.

2) The Elements that need to be arranged in the logical order in the figures

3) The thematic cartographic symbol is infrequently used in the entire graph groups but should be impressed by the reader.

4) A thematic cartographic element appears in the form of a series of maps at the same spot in different graph groups and needs to use an identical set of symbols.

The map color language standardization design comprises:
1) Color setting for the symbols of samples in which pesticides are "not detected", "detected but do not exceed MRLs" or "detected and exceed MRLs": according to the synesthesia and symbolic meanings of colors, "pesticide not detected" is represented in green that symbolizes safety; "detected but do not exceed MRLs" is represented in yellow that symbolizes relatively safe but warning meaning; "detected and exceed criteria" is represented in red that symbolizes danger;
2) Color setting for symbols that represent "low toxic pesticides", "moderately toxic pesticides", "highly toxic pesticides" and "vitally toxic pesticides": colors are set for "low toxic", "moderate toxic" and "highly toxic" pesticides in yellow, orange and red sequentially; "vitally toxic" pesticides are identified in purple that symbolizes "toxicity" in itself;
3) Color setting for "non-forbidden pesticides" and "forbidden pesticides": "non-forbidden pesticides" are presented in green, and "forbidden pesticides" are presented in red.
4) Color setting for countries and regions: different countries and regions are represented in different colors for contrast.

The chart interaction comprises customization of statistical charts and classification charts, selection and filtering of statistical indexes and classification indexes and displaying details during hover.

The customization of statistical charts and classification charts refers to select form information for symbols according to the user's requirement, such as symbol type and color, size, transparency, thickness, circle ratio, ring ratio, quantity of classifications, model and color system, and thereby parse and generate a new customized thematic map.

The selection and filtering of statistical indexes and classification indexes are to select the types of statistical themes and the chart names in the Table 1 according to the user's requirement, and generate thematic maps from the statistical indexes and classification indexes.

The detailed information display during hover includes regional and prompting information. The prompting information includes symbol drawing, legend drawing, returning to the region of each part of the charts, and other representation information.

The map interaction comprises basic map interaction and inter-connection among regions. The basic map interaction comprises map browsing, zoom in/out, panning and reset, etc.; the inter-connection among regions refers to switch between thematic maps of the same content in different regions, i.e., the thematic maps are coded according to administrative division code and thematic map content code; then, the code of a target region is obtained, and the name of a target thematic map is determined; finally, the target thematic map is generated.

The generation of thematic map refers to generate a physical map or electronic map on which the pesticide residue data is presented concisely and intuitively according to the user requirement. It comprises the following steps:

Step 1: the user selects the content for statistics in a database. The content for statistics may be a two-dimensional statistical data table and include a number of statistical indexes; for example, the table of pesticide residue situation according to different standards includes 20 statistical indexes, including number of samples in which pesticide residues exceed criteria, number of samples in which pesticide residues are detected but do not exceed criteria, number of samples in which no pesticide residue is detected, exceeding percent, percent of pass and detection rate, etc., according to China, European Union and Japan MRLs. After the content for statistics is determined, required geographic base map data can be obtained automatically according to the administration levels of the statistical units in the statistical table;

Step 2: online thematic maps are suitable for single-screen and single-task information presentation model. Through chart interaction, the user needs to select data indexes for the content of current map visualization, including statistical data indexes and classification data indexes; after the statistical data indexes and classification data indexes are selected, the system performs query and analysis, and guides the user to select the most appropriate types of statistical charts and classification charts;

Step 3: after the statistical charts and classification charts are determined, through map interaction, the user may set the forms of the charts and then view the thematic maps generated on the screen. It may add legends and save and export the maps;

Step 4: if the selected content for statistics is inappropriate, or the user wants to reset the forms of the statistical charts or classification charts, the system supports modifying while viewing.

The thematic maps highlight spatial distribution characteristic of the data, greatly improve information transformation efficiency, deeply explore the potential rules of distribution of pesticide residues in agricultural products on the market, and thereby realize the following functions: firstly, the characteristics of pesticide residues in agricultural products are presented visually on maps at multiple spatial resolutions and multiple scales (nation—province—city); secondly, statistical analysis and mapping of the characteristics of pesticide residues in different types of agricultural products are carried out; thirdly, the characteristics of distribution and quantitative indexes of pesticide residues in space and agricultural product type are reflected; fourthly, the exceeding-standard situation of pesticide residues is presented by region and agricultural product species with reference to the MRLs standards in different countries.

Beneficial Effects of the Present Invention:

1. The present invention puts forward a method for informatization and automation of the entire process of online pesticide residue big data acquisition, result judgment, statistical analysis and report generation based on a ternary interdisciplinary integration technique of high-resolution mass spectrometry, Internet and geographic information system, which greatly improves the depth, accuracy and efficiency of analysis.

2. A unique electronic identity card (electronic identification criterion) is created for each of more than 1,200 pesticides commonly used to realize pesticide residue detection. The conventional judgment method that utilizes real pesticide standards as reference is replaced with pesticide electronic standards to realize great-leap-forward development of non-targeted pesticide residue detection techniques.

3. Key techniques for associated storage and query for "multi-national MRLs—categories of agricultural products—properties of more than 1,000 pesticides" are provided.

4. As an interface and interaction way between big data and user, modern maps shall have self-adaptive and interactive reaction features, user and applied scenario perception capability, taking account of the requirement for integrated cognition of the subject and object of map generation and application. An online customization mode is established for the statistical thematic maps in the present system to support the users to select and filter the statistical data autonomously, to highlight the interest data or key data; and support the user to customize the symbol types and colors of the thematic map to improve data presentation and big data analysis capability.

5. The series thematic maps (real maps and electronic maps) of pesticide residues in commercial edible agricultural products can scientifically and intuitively present the safety situation of commercial edible agricultural products, facilitate regulation of the government sectors and guide consumption orientation of the public, and are of great scientific significance and high commercial application value.

IV. BRIEF DESCRIPTION OF FIGURES

FIG. 9 shows an example of visual tracing and pre-warning, wherein, (a) shows tracing and pre-warning by place of origin; (b) shows tracing and pre-warning by pesticide, and (c) shows tracing and pre-warning by agricultural product species.

V. EMBODIMENTS

This invention will be presented in detail with figures and embodiments.

In the present invention, multi-dimensional spatial pesticide residue visual tracing software that covers target pesticides, names of foods, and origin places of foods, etc., is developed based on ternary interdisciplinary integration technique of high-resolution mass spectrometry, Internet and geographic information system (GIS).

Figure 1:
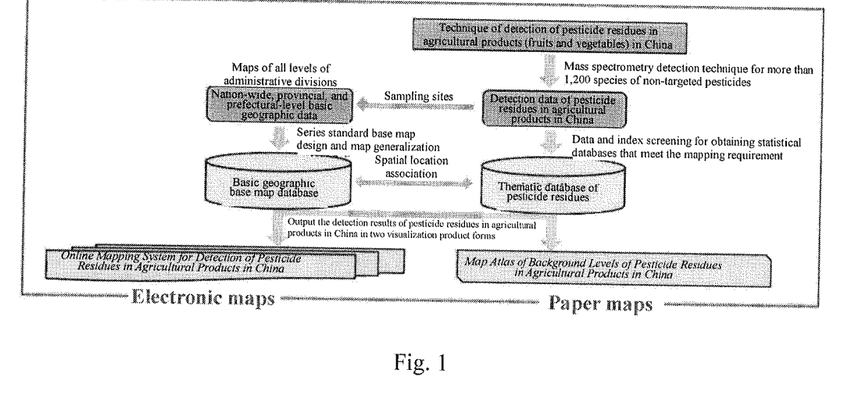
FIG. 1 shows the technical route of pesticide residue visualization.
Figure 2:
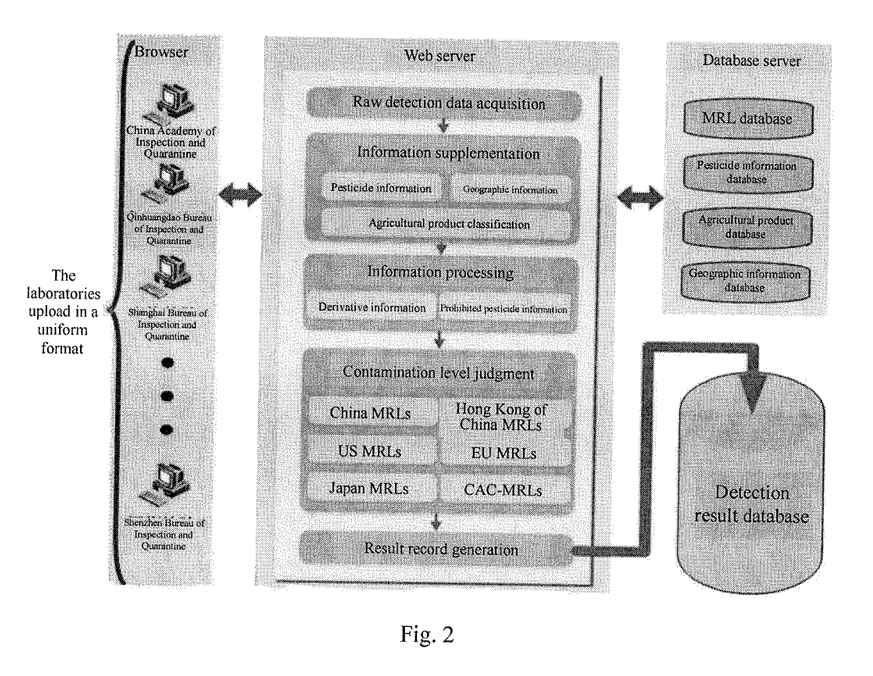
FIG. 2 shows the pesticide residue detection data acquisition system.
Figure 3:
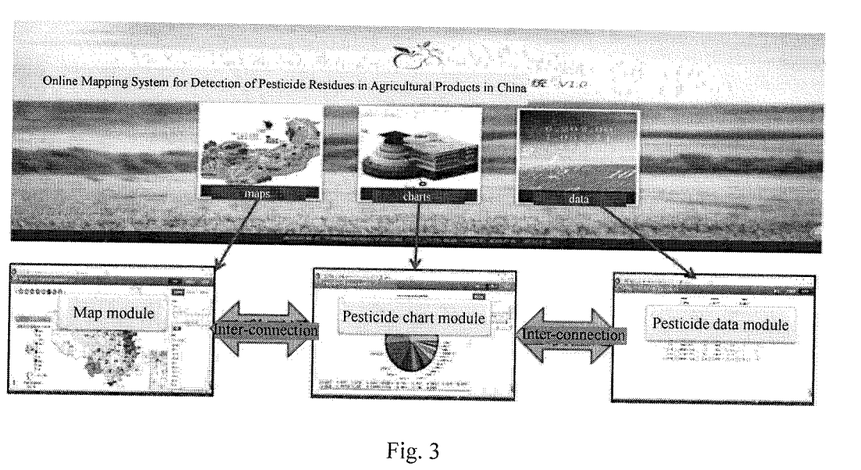
FIG. 3 shows the online mapping system for detection of pesticide residues in agricultural products in China.

As shown in FIGS. 1-5, in the present invention, geographic data and pesticide residue data are associated with each other to realize a new utilization of China map driven by pesticide residue data. As shown in FIG. 1, the major techniques include: firstly, the characteristics of pesticide residues in agricultural products are presented at multiple spatial resolutions and multiple scales (country—province—city); secondly, statistical analysis and mapping of the characteristics of pesticide residues in different types of agricultural products are carried out; thirdly, the characteristics of distribution and quantitative indexes of pesticide residues in space and agricultural product type are reflected; fourthly, the exceeding—criteria situation of pesticide residues is presented by region and agricultural products species with reference to the MRLs in China, the European Union and Japan, etc. Thus, a multi-dimensional spatial feature visualization system that covers target pesticides, names of foods, and places of origin of foods, etc., is designed and generated based on multi-element integration technique of high-resolution mass spectrometry, Internet and GIS. Then two products are produced, one is map atlas of pesticide residue levels in commercial fruit and vegetables in 31 provincial capitals/municipalities, as shown in FIG. 3, and the other is Online Mapping System for Pesticide Residues in Agricultural Products in China, as shown in FIG. 9, so management of three key aspects (pesticide residue detection, tracing and pre-warning) on one "intelligent map" is realized. This is an effective tool for pesticide residue risk tracing in China.

A first-level accurate mass database and a second-level fragment ion spectra library of more than 1,200 pesticides in the world (the specific pesticide species are listed in patent documents CN105738460A and CN105628839A) are established by Liquid Chromatography-Quadrupole-Time of Flight Mass Spectrometry (LC-Q-TOF/MS) and Gas Chromatography-Quadrupole-Time of Flight Mass Spectrometry (GC-Q-TOF/MS). On that basis, a unique electronic identity card (electronic identification criterion) is created for each of more than 1,200 pesticides, so pesticide residue detection is realized, the conventional judgment method that utilizes real pesticide standards as reference is replaced with a method that utilizes electronic standards, and great-leap-forward development of non-targeted pesticide residue detection techniques is realized.

Four major basic sub-databases covering the pesticide residue MRL standards in several countries, agricultural product categories, properties of more than 1,000 pesticides, and China geographic information are established. With a data associative storage and query model based on "multinational MRLs—agricultural product categories—properties of more than 1,000 pesticides", the four major basic sub-databases are associated with each other, associative access and invocation of basic pesticide residue data is realized, and a standard basis is provided for judgment of pesticide residue detection results.

A pesticide residue data acquisition system is designed, and a national pesticide residue detection result database is established. A data integration and processing model consisting of "data acquisition—information supplementation—derivative merging—prohibited pesticide alert—contamination level judgment" is put forth, rapid online acquisition and merging of pesticide multi-residue detection result data and accurate judgment with reference to pesticide maximum residue limit (MRL) in several countries are realized, dynamic addition and real-time update of the pesticide residue detection result database is realized, and a scientific data basis is provided for decision-making of national food safety. The designed pesticide residue detection data acquisition system is shown in FIG. 2. The pesticide residue detection data acquisition system employs three-layer architecture based on browser/server and employs ASP.NET technique, to realize automatic uploading of detection results and judgment of contamination levels, and to establish a nation-wide pesticide residue detection result database. The working principle thereof is as follows: (1) acquiring raw detection result data; (2) supplementing pesticide, region and agricultural product category information; (3) carrying out derivative merging and pesticide toxicity categorization; (4) judging contamination level according to the MRLs of the countries or regional organizations; (5) generating result records and storing them in the detection result database.

By means of association between geographic data and pesticide detection data, a new application of China map driven by pesticide residue data—map atlas of pesticide residue levels in commercial fruits and vegetables in 31 provincial capitals/municipalities, and an online pesticide residue mapping system—is developed. Thus, management of three key aspects (pesticide residue detection, tracing, and pre-warning) on one "intelligent map" is realized. For self-discipline in the industry, supervision by the government and supervision by third parties, scientific data support based on spatial visualization is provided, a multi-scale open thematic map representation framework oriented to "country—province—city (district)" is constructed to facilitate integration of existing data and realize dynamic addition and real-time update of future data.

Figure 5:
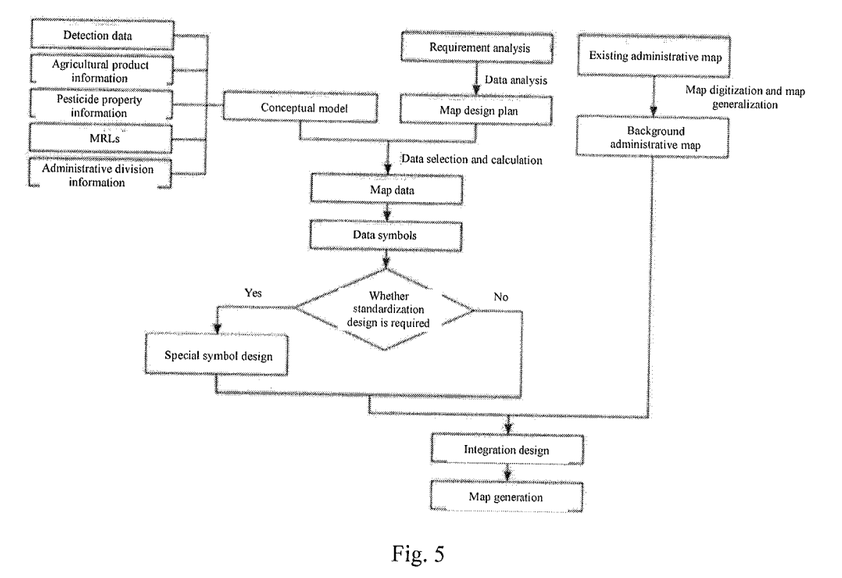
FIG. 5 shows major mapping procedures.
Figure 9A:
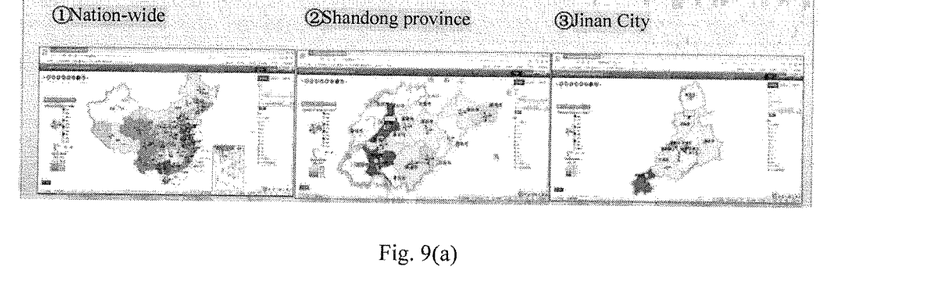
Figure 9B:
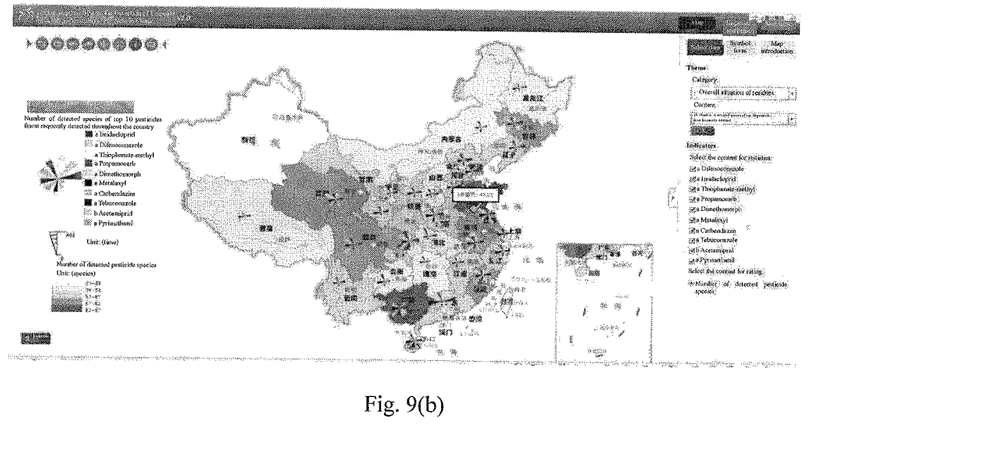
Figure 9C:
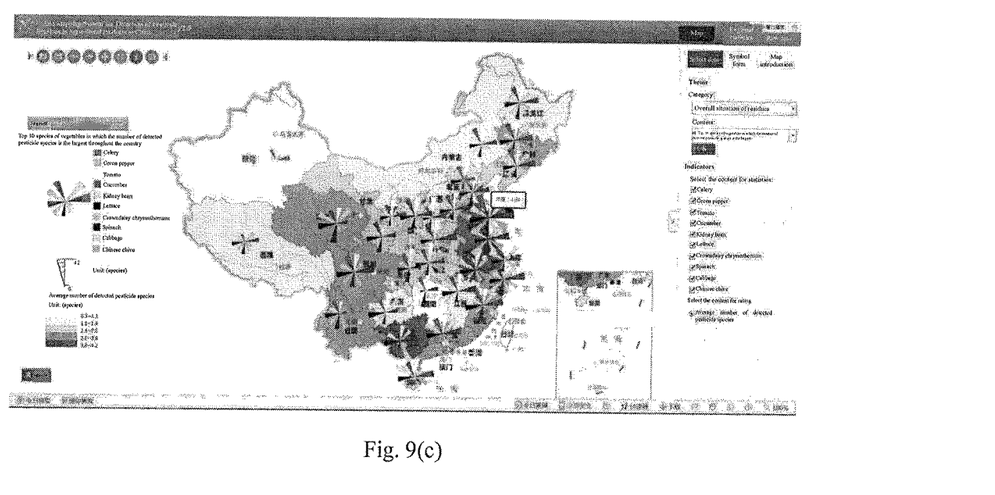

As an interface and interaction means between big data and user, modern maps shall have self-adaptive and interactive reaction features, etc., user and applied scenario perception capability, and taking account of the requirement for integrated cognition of the subject and object of map generation and application. An online customization mode is established for the statistical thematic maps in the present invention to support the users to select and filter the statistical data autonomously, to highlight the data of interest or key data, to support the user to customize the symbol types and colors of the thematic map, to improve data presentation and big data analysis capability. As shown in Table 2, 20 significant statistical indexes are found through analysis. The present pesticide residue levels in major agricultural products in China are presented visually and intuitively, and integration of multi-dimensional statistical property and spatial location property of pesticide data is realized. The map generation process is shown in FIG. 5, the map effects are shown in FIGS. 9a, 9b, and 9c.

Figure 4:
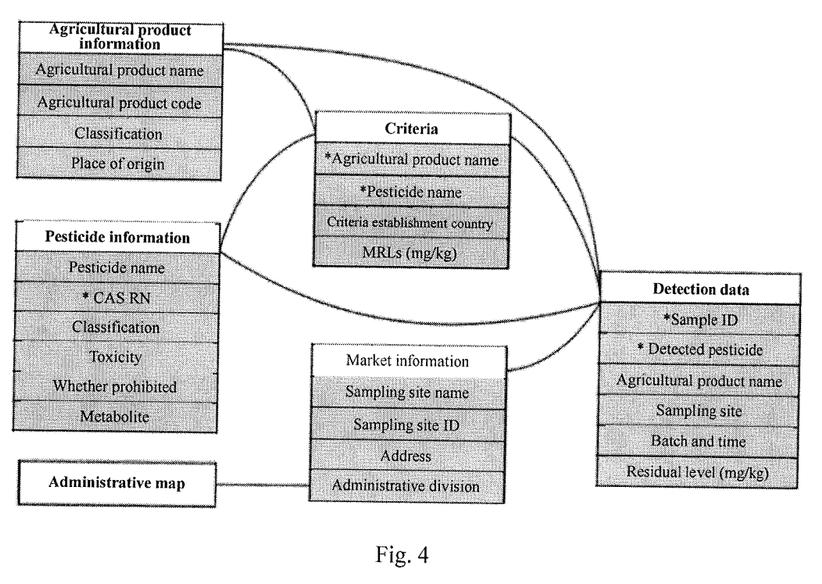
FIG. 4 shows the conceptual model of raw data.
Figure 6:
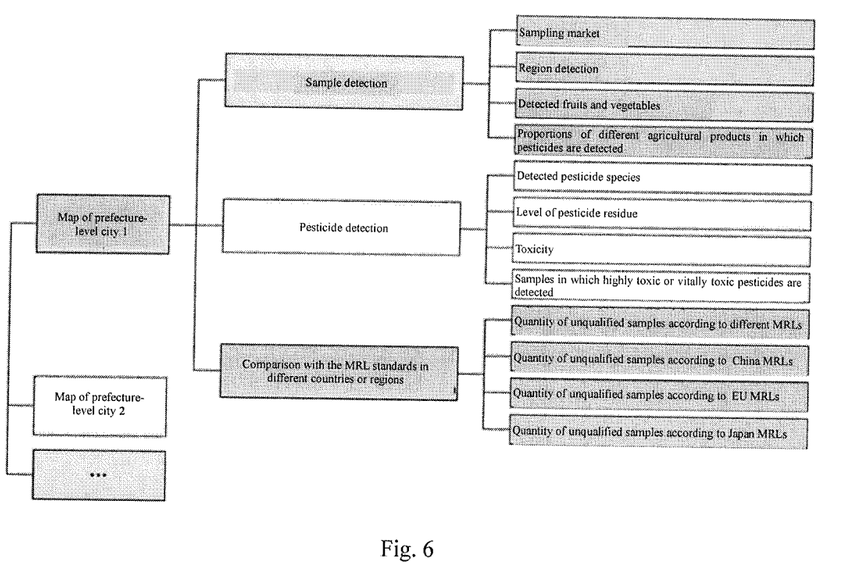
FIG. 6 shows the structure of contents of a thematic map to be produced.

Specifically, the generation of a final thematic map from raw pesticide detection data undergoes four stages: requirement investigation, data processing and conversion, standardization design of map languages, and comprehensive map design. The details of the major procedures are shown in FIGS. 4, 5 and 6, and the following text description introduces each stage in detail.

TABLE 2

20 Statistical Indexes

| | |
|---|---|
| (1) It is found that pesticide residues commonly exist in commercial fruits and vegetables in 31 provincial capitals/municipalities. The pesticide residue detection rate is 39%-88% (LC-Q-TOF/MS) or 54%-97% (GC-Q-TOF/MS). | (2) It is found that total 517 pesticides are detected in more than 150 species of fruits and vegetables in 18 categories (wherein, 93 pesticides are detected by both techniques). |
| (3) It is found that the percent of pass of pesticide residues in the commercial fruits and vegetables in 31 provincial capitals/municipalities 96.3%-98.7%, which means that the safety level is assured essentially. | (4) The characteristics patterns of pesticide residue detection levels (1-5, 5-10, 10-100, 100-1,000, >1,000 µg/kg) in China are discovered (by comparison with MRLs in China, European Union and Japan, etc.). |
| (5) The characteristics patterns of detected pesticide species in individual samples in China (not detected, 1 species, 2-5 species, 6-10 species, >10 species) are discovered. | (6) The characteristics patterns of detected Pesticide species in the same category of samples in China (not detected, 1 species, 2-5 species, 6-10 species, >10 species) are discovered. |
| (7) The characteristics patterns of pesticide functions in China (insecticides, bactericides, herbicides, plant growth regulators, synergistic agents and other species, and their proportions) are discovered; | (8) The characteristics patterns of toxicity of pesticides in China (species of slightly toxic, low toxic, slightly low toxic, moderately toxic, highly toxic, vitally toxic and prohibited pesticides, and their proportions) are discovered. |
| (9) The order of pesticide species detected throughout the country and in the provincial capitals and the order of frequencies of detection are discovered, revealing the differences in pesticide application in fruits and vegetables among different regions throughout the country. | (10) The order of safety (not detected, detected but not exceeding criteria and exceeding criteria) of the detected pesticides throughout the country and in the provincial capitals is discovered (by comparison with MRLs in China, European Union and Japan). |
| (11) It is found that the pesticide MRL standards in China is confronted with a challenge of lower level and smaller amount when compared with MRL standards in US, European Union and Japan. | (12) It is found that only 40% of the massive residue data in the general investigation is used according to the criteria in China, while the application ratio of the data is as high as 95% or above in European Union and Japan; consequently, |
| (13) Top 10 species of fruits and vegetables in which the quantities of detected pesticide species are the largest and the order of follow-up fruits and vegetables are discovered; it is found that the common fruits and vegetables are contaminated severely. | (14) Top ten species of fruits and vegetables in which the average detected frequency of pesticides is the highest and the order of the follow-up fruits and vegetables are discovered. |
| (15) The species and detection frequencies of highly toxic, vitally toxic and prohibited pesticides are discovered. | (16) Top ten fruits and vegetables in which the quantities of detected highly toxic, vitally toxic and prohibited pesticides are the largest and the order sequence of fruits and vegetables are discovered. |
| (17) Top ten fruits and vegetables in which the detected frequency of highly toxic, vitally toxic and prohibited pesticides is the highest and the order sequence of fruits and vegetables are discovered. | (18) The general characteristics of and the differences in the pesticides in the commercial fruits and vegetables in 31 provincial capitals/municipalities are discovered. |
| (19) The characteristics of and the differences in the pesticides detected at the sampling sites in 31 provincial capitals/municipalities are discovered. | (20) The characteristics of and the differences in the use of pesticides in 31 provincial capitals/municipalities are discovered. |

EXAMPLES

In the present invention, the online pesticide residue tracing and pre-warning visualization maps designed on high-resolution mass spectrometry, Internet and GIS could mainly serve for four user groups:

(1) Government organizations: these maps are designed for government organizations (especially quality supervision departments) to master the safety situation of foods rapidly and accurately, so that they can supervise more targetedly.

(2) Self-discipline of the enterprises: these maps enable the enterprises to know the scientific rule of pesticide utilization, so that the enterprises can use and apply the pesticides scientifically during the planting.

(3) Consumers: consumers usually pay more concern on the safety of some species of foods. With the method and maps provided in the present invention, third-party supervision and joint management by the society could be realized. The invention can guide the public safe shopping, which is strongly demanded.

(4) Researchers: the maps enable researchers to carry out comparative analysis of food safety criteria in different countries and regions, are helpful for determining weak parts in food safety supervision in these countries and can improve the development and update of criteria.

In the example of the present invention, pesticide detection data in 46 cities in China and MRLs in China, Japan and European Union are acquired according to thematic map design. The thematic map of each city includes three aspects: sampling situation, pesticide detection situation and differences among different criteria. As the atlas contains 552 maps in total (12 maps per city) which is too many, the map design process is illustrated with two maps as example in this invention.

The design steps are as follows:

1. Sources of Detection Data Acquisition

The data in the present invention comes from "Study and Demonstration of High-Throughput Detection Technique for Pesticides and Chemical Pollutants in Foods" in the National Sci-Tech Support Plan in the Chinese $12^{th}$ Five Year Plan. 22,508 samples were collected from 1,109 sampling spots on the market in 46 cities of China (see FIG. 1), more than 1,200 pesticides are monitored by liquid chromatography-/gas chromatography-quadrupole-time of flight mass spectrometry (LC/GC-Q-TOF/MS). Operating under five unified specifications (unified sampling, unified sample preparation, unified detection method, unified format data uploading, and unified format statistical analysis reports), totally 20 items of indexes data in 5 categories including sampling sites, agricultural products, pesticides and detection criteria, etc., are collected as raw detection data in this invention.

The raw detection data structure includes the following five aspects:

Agricultural product property information: including names, primary category, secondary category, etc. of all species of agricultural products.

Pesticide property information: including names, CAS registry number, toxicity levels, whether the pesticides are metabolic products or not and their metabolic precursors, and whether the detected pesticides are prohibited in Chinese criteria or not;

Geographic information of sampling sites: including provincial administrative division, prefectural level administrative division, county-level administrative division and detailed addresses of all sampling sites;

Detection criteria information: including pesticides to be detected, agricultural products, maximum residue limits, criteria issued countries;

Detection result data: including sample numbers and names, names of sampling sites, administrative divisions of sampling sites, agricultural product species, detection methods, pesticide detected and residual level, etc. It should be noted that each item of data here is only for one species of pesticide residual in one sample; multiple items of data will be generated if one sample contains multiple species of residual pesticide; an item of data that indicates "not detected" is generated if no pesticide residue is detected in the sample.

The conceptual model is shown in FIG. 4, asterisk represents characteristic variable, and variables in gray color have not been included in the present research due to data problem and will be supplemented into the research when appropriate data is available in the future.

2. Map Visualization Process

The generation of a final thematic map from raw pesticide detection data goes through four stages: requirement investigation, data processing and conversion, standardization design of map languages, and comprehensive map design. FIG. 5 shows the details of the major procedures and introduces the stages in detail.

(1) Requirement Investigation

In this step, the structure and content of the series maps are determined according to the results of requirement investigation and data analysis. In the invention, it is found that the clients (government officials and researchers) have a strong demand for information in three aspects: sampling situation, pesticide detection information and differences in monitoring results among criteria in different countries or regions. Under this situation, based on the data in one area, 12 maps and 13 statistical charts are grouped into a map group. The structure and contents of a thematic map could be presented as shown in FIG. 9.

(2) Data Processing and Conversion

Data analysis is to convert all raw data into comprehensive data suitable for mapping through calculation. In the data processing, data are categorized in accordance with function and employed different calculation strategies, highly integrated data is obtained; the data is further screened to set out specific data for mapping. Standardization design is carried out for the data, and standardization treatment is made according to the processed data. Finally, comprehensive design is processed on the map data and criteria.

The thematic mapping in this research mainly belongs to the domain of statistical mapping, and uses common statistical methods such as counting, categorization, classification, summation, expectation, and percentage to describe phenomena in different aspects and different extents. Data functions and map objects need to be included when the raw data is translated and converted into map data for map design and development. Various of statistical methods are integrated in the calculation to ensure the final data is highly integrated.

For example, to ascertain the number of species of pesticides detected in a city A, the samples are grouped into five groups: samples in which no pesticide is detected, samples in which 1 pesticides is detected, samples in which 2-5 pesticides are detected, samples in which 6-10 pesticides are detected and samples in which more than 10 pesticides are detected. Then, the number of samples in each group is calculated, and the percentage number of samples in each group is calculated. In this example, various of statistical methods such as counting, classification, summation and percentage are used to describe the characteristics of administrative division of each data set. As a result, the reader can learn about the types of pesticides used in the agricultural products simply and clearly.

(3) Standardization Design of Map Languages

The series thematic maps must be developed with preciseness and uniformity. Therefore, the design of the map elements should be fully controlled. The map language system consisting of map symbols and notes could be divided into three map languages on their description: graphic language, color language and verbal language. The verbal language is relatively easy to understand and master, while the unification and coordination of the other two languages is relatively complex. The symbols to be unified can be determined from the screened map data, and thereby pertinent standardization design can be carried out. The standardization design is one of the most important steps in map design, because its style is directly related with the unification of the map symbol system. A key point in map language standardization design is to ensure the designed symbols meet the requirements of aesthetic theory and map language system theory at the same time. Hence, hereunder the standardization design will be discussed in detail.

(4) Comprehensive Design

There are two missions in this step. The first is to design elements that do not require standardization design, such as statistical charts and base colors of regional levels; the second is to carry out page layout design, which is necessary in atlas design.

Next, map language standardization design must be implemented:

The generation of series thematic maps requires rigorous unification and coordination. Therefore, the design of map elements must be controlled in overall. The elements (symbols and notes, etc.) in the maps constitute map languages, and the map languages can be divided into graphic language, color language and verbal language of maps by the form of presentation. The verbal language is relatively easy to understand and master, but how to unify, coordinate and standardize the other two map languages in map visualization design is a relatively complex problem. Analysis may be carried out according to the screened map data, to find out the characteristics of the elements that need to be standardized, and thereby carry out standardization design of thematic maps pertinently.

The specific steps are as follows:

(1) Standardization of Graphic Language of Maps

The graphic language of maps comprises graphical variables such as map symbol shape, direction and alignment, etc. Though examination according to the thematic mapping data after being screened in the above, it is found that the contents in the following aspects need to be unified graphically, and then a mapping standard is formed:

1) Geographic base maps in different regions. Different thematic maps of the same city shall employ the same geographic base map to facilitate the reader to compare different thematic elements. For example, in the maps (a), (b) and (c) in FIG. 9, the shading colors of different regions or provinces are different, but the shading color of the same region must be the same.

Figure 7:
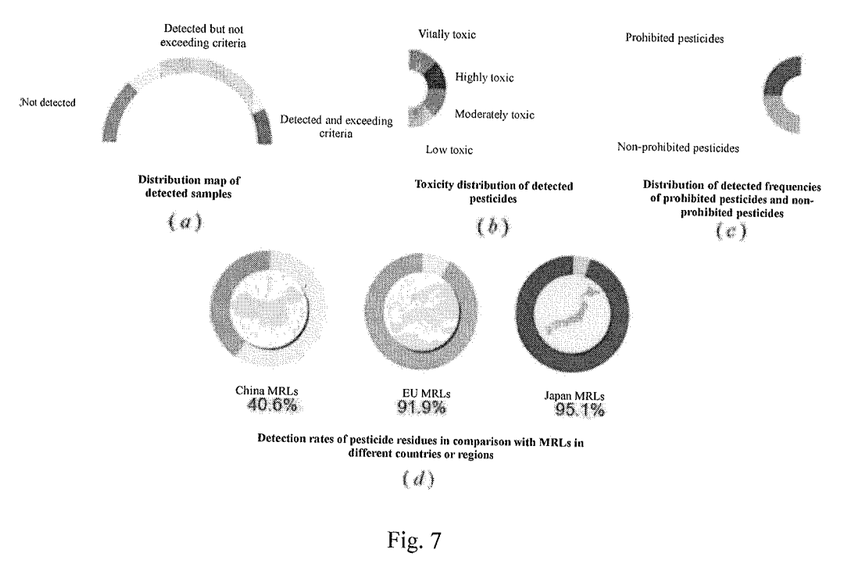
FIG. 7 shows the standardization design of map languages.

2) The elements need to be arranged in a certain logic sequence in the charts. For example, the detection results are sorted in the following sequence: "not detected", "detected but not exceeding criteria", and "detected and exceeding criteria" (see FIG. 7a); with regard to the pesticide toxicity and whether prohibited pesticides or not, the following sequence is used: low toxic pesticides, moderately toxic pesticides, highly toxic pesticides, vitally toxic pesticides (as shown in FIG. 7b), as well as non-prohibited pesticides and prohibited pesticides (as shown in FIG. 7c); the pesticide categories are sorted in the following sequence: insecticides, bactericides, herbicides, insect repellants, plant growth regulators and synergistic agents, etc.; the criteria in the countries are sorted in the following sequence: China MRLs, EU MRLs and Japan MRLs, etc. (as shown in FIG. 7d).

Figure 8:
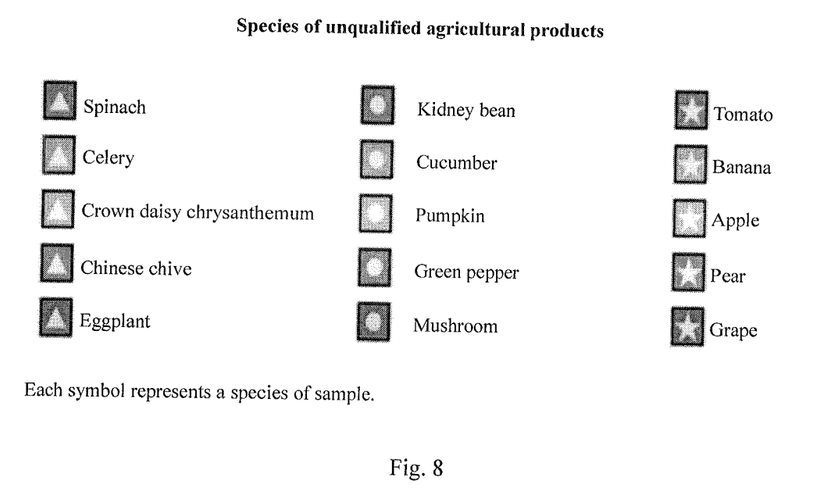
FIG. 8 shows the design of agricultural product symbols.

3) A specific thematic map presentation method may be used infrequently in the entire map series, so that the thematic map symbols can give a deeper impression to the reader; for example, the symbols of the sampling sites in the sampling sites distribution map, as shown in FIG. 8.

4) A thematic element that appears in the form of series maps at the same location in different map series should use the same symbol system. For example, in the distribution map of exceeding-criteria agricultural products in the counties/districts in different cities, the symbols of different agricultural products are implemented with the same set of symbols.

(2) Standardization of Color Language of Maps

The function of the colors in a thematic map is different from the colors in an ordinary picture. The colors in the thematic map often imply special information, such as quantity or property, etc., for example, the base colors of levels and the base colors of quality (e.g., in the three maps in FIG. 9, the color of a region is deeper means that the number of detected pesticide species in that region is greater). Therefore, the color language of thematic maps is an indispensable part of the map languages of thematic maps.

From the aesthetic perspective, a thematic map is designed in more abundant and beautiful colors. However, in the design of thematic maps, unified color design and standardization is required for some important thematic symbols to facilitate efficient information communication and improve unification and coordination of the series thematic maps. For example, regions where the numbers of detected pesticide species are comparable to each other should be presented in a uniform color. For the colors of the thematic symbols, there are usually industrial standards or well-recognized color synesthesia or symbolic meaning.

Color synesthesia refers to that a color can arouse an association with a specific object or experience in the life. For example, red color usually arouses an association with blood or the sun, etc.; green color usually arouses an association with leaves or forest, etc.; blue color usually arouses with association of sky or ocean, etc. The symbolic meaning of a color can be further abstracted from color synesthesia. For example, among the red, yellow and green colors of traffic lights, the red color is blood color, and may be extended to danger and stop, etc.; the yellow color is a common warning color in the natural world, and may be extended as warning; the green color is the color of leaves, and may be extended as peace and safety, as the Bible records that a pigeon holding an olive branch indicates that the world is peaceful.

According to the above definitions, in the series thematic maps in the present invention, symbols are designed uniformly and appropriately in the application of colors, and thereby a mapping standard is formed:

1) Color setting for the symbols of samples in which pesticides are "not detected", "detected but do not exceed criteria" or "detected and exceed criteria". According to the synesthesia and symbolic meanings of colors, "not detected" is represented in green that symbolizes safety; "detected but not exceeding criteria" is represented in yellow that symbolizes relatively safe but with warning meaning; "exceeding criteria" is represented in red that symbolizes danger, as shown in FIG. 7a.

2) Color setting for symbols that represent "low toxic pesticides", "moderately toxic pesticides", "highly toxic pesticides" and "vitally toxic pesticides". The pesticide toxicities are classified according to a lethal dose index of pesticide to human, i.e., the lower the lethal dose is, the higher the toxicity is. That is an ordinal scale, and the colors should be differentiated by lightness or saturation in the same hue of colors. However, in view of the vital importance of food safety, the colors should be differentiated by more prominent hue variables. In view that use of green that represents safety is not permitted in color setting for pesticide toxicity, "low toxic", "moderate toxic" and "highly toxic" are represented in yellow, orange and red sequentially; "vitally toxic" pesticides are identified in purple that symbolizes "toxicity" in itself, as shown in FIG. 7b.

3) Color setting for "non-prohibited pesticides" and "prohibited pesticides". The pesticides are categorized into "non-prohibited pesticides" and "prohibited pesticides", depending on whether they are prohibited by laws or not. According to the usual symbolic meanings of colors, "non-prohibited pesticides" are represented in green, and "prohibited pesticides" are represented in red, as shown in FIG. 7c.

4) Color setting for countries and regions. To display the differences in pesticide residue criteria among different countries and regions, different countries and regions are represented in different colors for contrast. In this document, the criteria that may be used as references are "China criteria", "European Union's criteria" and "Japan criteria". Since the lucky color in China is red, the percentage of forest coverage in Europe is higher and Japan is a maritime country, therefore China, Europe Union and Japan are represented in red, green, and blue respectively, as shown in FIG. 7d. Thus, an example of visualization of pesticide residues in agricultural products in China is designed, as shown in FIG. 9, wherein FIG. 9(a) shows a place of origin tracing and pre-warning visualization map for pesticide residues in agricultural products at multiple spatial resolutions covering "nation—province—city (district)", which represents the characteristics of pesticide residues in agricultural plants at multiple spatial resolutions in multiple dimensions at national level, provincial and prefectural level, and county and district level. FIG. 9(b) shows a pesticide tracing visualization map of pesticide residues in agricultural products in China, including top 10 pesticide detected throughout China (by LC-Q-TOF/MS): imidacloprid, difenoconazole, thiophanate-methyl, propamocarb, dimethomorph, metalaxyl, tebuconazole, acetamiprid and pyrimethanil. FIG. 9(c) shows a visualization map of pesticide residues in different types of agricultural products in China, including top 10 vegetables in which the number of detected pesticide (by LC-Q-TOF/MS) throughout China: celery, green pepper, tomato, cucumber, kidney bean, lettuce, crown daisy chrysanthemum, spinach, cabbage and Chinese chive.

The above detailed description is provided only to describe some feasible embodiments of the present invention rather than limit the protection scope of the present invention. Any equivalent embodiment or modification implemented without departing from the spirit of the present invention shall be deemed as falling into the protection scope of the present invention.

The invention claimed is:

1. An online pesticide residue tracing and pre-warning visualization method based on high-resolution mass spectrometry, Internet and geographic information system, comprises the following steps:

step S1. establishing a rapid pesticide residue detection method based on high-resolution mass spectrometry for edible agricultural products;

step S2. constructing a nation-wide pesticide residue detection information sharing database based geographic information gathered on the Internet, and generating large databases containing multi-dimensional data and performing data processing;

step S3. carrying out visual analysis and presentation based on the geographic information of administrative divisions in a country, performing statistics and conversion for the geographic information in a nation-wide pesticide residue detection result database among databases containing multi-dimensional data, performing map visualization to generate a thematic map; wherein the pesticide residue detection information is displayed visually on the thematic map and used for pre-warning and tracing; wherein the thematic map supports online customization mode, from which a user is able to select and filter statistical data autonomously, highlighting data of interest or key data, and customizing symbol types and colors of the thematic map, so as to improve data presentation and big data analysis capability; and performing statistics and conversion of the information in the nation-wide pesticide residue detection result database, wherein:

the statistics in step S3 comprises calculation of maximum value, minimum value, average value and median value by conducting a query for top N pesticides detected in a largest number of regions, statistics on top N vegetables in which the average detected frequency of pesticides is the highest and statistics of N pesticides with a highest limit rate according to China criteria; wherein the conversion comprises selection of said statistical data, information type selection, symbol change and color coding of statistical chart, and selection of a classification method, number of classifications and color systems of a classification chart, wherein:

the map visualization process in step S3 comprises: map graphic language standardization, map color language standardization, chart interaction and map interaction;

wherein the map graphic language standardization design comprises:

1) geographic base maps in different regions and different thematic maps of a same city employing the same geographic base map;
2) arranging elements in a logic sequence in charts;
3) selecting multiple specific thematic map presentations from a map series; and
4) employing a thematic element, which appears in the form of series maps at a same location in different map series, using the same symbol system;

wherein the map color language standardization design comprises:

1) color setting for symbols of samples in which pesticides are "not detected", "detected but not exceeding Maximum Residue Levels, MRLs", or "detected and exceeding MRLs": according to synesthesia and symbolic meanings of colors, wherein "pesticide not detected" is represented in the color green that symbolizes safety; "detected but not exceeding MRLs" is represented in the color yellow that symbolizes relatively safe but has warning meaning; "detected and exceeding MRLs" is represented in the color red that symbolizes danger;
2) color setting for symbols that represent "low toxic pesticides", "moderately toxic pesticides", "highly toxic pesticides" and "vitally toxic pesticides", wherein colors are set for "low toxic", "moderately toxic" and "highly toxic" pesticides in the colors yellow, orange and red sequentially; "vitally toxic" pesticides are identified in the color purple that symbolizes "toxicity" in itself;
3) color setting for "non-prohibited pesticides" and "prohibited pesticides": "non-prohibited pesticides" are represented in the color green, and "prohibited pesticides" are represented in the color red; and 4) color setting for countries and regions: different countries and regions are represented in different colors for contrast;

wherein the chart interaction comprises customization of statistical charts and classification charts, while selection and filtering of statistical indexes and classification indexes and detailed pesticide information is shown;

wherein the customization of statistical charts and classification charts are selected from information for statistics symbols and classification symbols according to user requirements, which include display symbol type, color, size, transparency, line thickness, circle ratios, ring ratios, number of classifications, and parsing and generating new thematic maps, and displaying an effect of thematic maps after customization;

wherein the selection and filtering of statistical indexes and classification indexes selects types of statistical themes and the chart names according to the user requirement, and generate thematic maps from the statistical indexes and classification indexes;

wherein the detailed information display includes regional and prompt information, wherein the prompt information includes symbol, legend, returning to the region of each part of the charts, and representative information;

wherein the map interaction comprises basic map interaction and inter-connection among regions;

the basic map interaction comprises map browsing, zooming in/out, and panning, or resetting a map;

the inter-connection among regions refers to switch between thematic maps of a same content in different regions wherein the thematic maps are coded according to the administrative division code and thematic map content code; then, a code of a target region is assigned, and the name of a target thematic map is determined from code; and the target thematic map is generated by generating a map on which the pesticide residue data is presented according to the user requirement, by the following steps:

step 1: the user selects a two-dimensional statistical data table which table includes several statistical indexes; and geographic base map data is generated according to statistical units;

step 2: generating online thematic maps suitable to single-screen and single-task information presentation model; wherein through chart interaction, the user is able to select data indexes for a content of current map visualization, including statistical data indexes and classification data indexes; after the statistical data indexes and classification data indexes are selected, the system performs query and analysis of the statistical data indexes and the classification data indexes, and guides the user to select from the statistical charts and classification charts;

step 3: wherein after the statistical charts and classification charts are determined, through map interaction, the user sets forms of the charts and then views the thematic maps outputted on the screen, and adds legends and saves and exports the maps; and step 4: wherein the selected content for statistics is out of pesticide standard, or the user wants to reset forms of the statistical charts or classification charts, the system permits modifying while viewing.

2. The online pesticide residue tracing and pre-warning visualization method based on high-resolution mass spectrometry, Internet and geographic information system according to claim 1, wherein, the implementation of the step S1 comprises:

first, a first accurate mass database of more than 1,000 pesticides in the world and a second fragment ion spectra library are established by Liquid Chromatography Quadrupole Time-of-Flight Mass Spectrometry (LC-Q-TOF/MS) and Gas Chromatography Quadrupole Time-of-Flight Mass Spectrometry (GC-Q-TOF/MS); and then, one sample preparation, and more than 1,200 pesticides are detected rapidly in a non-targeted manner with two high-resolution mass spectrometry detection techniques, GC-Q-TOF/MS and LC-Q-TOF/MS simultaneously.

3. The online pesticide residue tracing and pre-warning visualization method based on high-resolution mass spectrometry, Internet and geographic information system according to claim 1, wherein, the establishment of large databases containing multi-dimensional data in the step S2 comprises establishing a nation-wide pesticide residue detection result database and four sub-databases.

4. The online pesticide residue tracing and pre-warning visualization method based on high-resolution mass spectrometry, Internet and geographic information system according to claim 3, wherein, the nation-wide pesticide residue detection result database is obtained by the following method:

firstly, detecting the pesticide residues of 18 categories of pesticides in 150 species of edible agricultural products over a course of a year with the rapid pesticide residue detection method based on high-resolution mass spectrometry in step S1, by several union laboratories distributed across the country and under five unified standard operations which refer to unified sampling, unified sample preparation, unified detection method, unified format data uploading, and unified format statistical analysis reports to obtain raw data of relevant pesticide residues;

secondly, correlating each piece of raw pesticide residue data with information in the four sub-databases: (1) replacing names of all pesticide metabolites with names of original pesticides according to information of an agricultural product category database; (2) replacing non-standard names of agricultural products with standard names and unifying an agricultural product classification method according to the agricultural product category database; (3) judging the detection result of each detected item according to different MRLs in a multi-national or regional MRL database; (4) categorizing the pesticides by their properties according to a pesticide information database; and (5) locating each sampling site according to information of a geographic information database to ascertain the geographic location and involved administrative division of each sampling site; and finally, the detection data of pesticide residues comprises three parts of information: sample identification information, geographic information of sample collection and sample detection information to realize dynamic addition and real-time update of the nation-wide pesticide residue detection result database.

5. The online pesticide residue tracing and pre-warning visualization method based on high-resolution mass spectrometry, Internet and geographic information system according to claim 4, wherein, the sample identification information is configured to record information of sample name, sample number and sampling time; the geographic information of sample collection records information of sampling site, type of sampling site and province/city/county of the sampling site; the sample detection information records information of name of detected item, Chemical Abstract Services CAS registry number of detected item, detection result, detection method, qualitative Time of Flight TOF score, and Qualitative Time of Flight Q-TOF score.

6. The online pesticide residue tracing and pre-warning visualization method based on high-resolution mass spectrometry, Internet and geographic information system according to claim 3, wherein, four major basic sub-databases comprise a multi-national MRLs database, an agricultural product category database, a basic pesticide information database and a geographic information database.

7. The online pesticide residue tracing and pre-warning visualization method based on high-resolution mass spectrometry, Internet and geographic information system according to claim 6, wherein, the multi-national MRLs database comprises China MRL, Hong Kong of China MRL, US MRL, EU MRL, Japan MRL and CAC MRL.

8. The online pesticide residue tracing and pre-warning visualization method based on high-resolution mass spectrometry, Internet and geographic information system according to claim 6, wherein, the agricultural product category database contains China, Hong Kong of China, US, EU, Japan and CAC classification criteria, and specifically comprises names of agricultural products, primary, secondary and tertiary classification information.

9. The online pesticide residue tracing and pre-warning visualization method based on high-resolution mass spectrometry, Internet and geographic information system according to claim 6, wherein, the pesticide information database contains basic information, toxicity distribution of detected particles information, chemical composition, and distribution of detected frequencies of prohibited and non-prohibited pesticides information, and specifically comprises compound names, CAS registry numbers, toxicity level, whether the pesticides are metabolic products or not and their metabolic precursors and whether the detected pesticides are prohibited in the criteria or not.

10. The online pesticide residue tracing and pre-warning visualization method based on high-resolution mass spectrometry, Internet and geographic information system according to claim 6, wherein, the geographic information database covers required geographical scopes, and comprises detailed addresses of all sampling sites in provincial administrative division, prefectural administrative division and county administrative division.

* * * * *